United States Patent
Wang et al.

(10) Patent No.: US 10,216,959 B2
(45) Date of Patent: Feb. 26, 2019

(54) METHOD AND SYSTEMS USING PRIVACY-PRESERVING ANALYTICS FOR AGGREGATE DATA

(71) Applicants: Mitsubishi Electric Research Laboratories, Inc., Cambridge, MA (US); Mitsubishi Electric Corporation, Tokyo (JP)

(72) Inventors: Ye Wang, Andover, MA (US); Mitsuhiro Hattori, Tokyo (JP); Takato Hirano, Tokyo (JP); Rina Shimizu, Tokyo (JP); Nori Matsuda, Tokyo (JP)

(73) Assignees: Mitsubishi Electric Research Laboratories, Inc, Cambridge, MA (US); Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 15/224,742

(22) Filed: Aug. 1, 2016

(65) Prior Publication Data
US 2018/0032758 A1    Feb. 1, 2018

(51) Int. Cl.
*H04L 29/06* (2006.01)
*G06F 21/62* (2013.01)
*G06Q 50/06* (2012.01)

(52) U.S. Cl.
CPC ...... *G06F 21/6254* (2013.01); *H04L 63/0421* (2013.01); *G06Q 50/06* (2013.01)

(58) Field of Classification Search
CPC .................. H04L 63/0421; H04L 63/0407
(Continued)

(56) References Cited

U.S. PATENT DOCUMENTS

| 9,092,970 | B2 | 7/2015 | Denic et al. |
| 2006/0080554 | A1* | 4/2006 | McDonald .......... G06F 21/6254 713/189 |

(Continued)

FOREIGN PATENT DOCUMENTS

| WO | 2014031551 A1 | 2/2014 |
| WO | 2014123893 A1 | 8/2014 |

(Continued)

OTHER PUBLICATIONS

Erdogdu, Murat A., Nadia Fawaz, and Andrea Montanan. "Privacy-utility trade-off for time-series with application to smart-meter data." Workshops at the Twenty-Ninth AAAI Conference on Artificial Intelligence. 2015.

(Continued)

*Primary Examiner* — Jason K Gee
*Assistant Examiner* — Dereena T Cattungal
(74) *Attorney, Agent, or Firm* — Gene Vinokur; James McAleenan; Hironori Tsukamoto

(57) ABSTRACT

Methods and systems for transmitting user aggregate data to a third party, such that a privacy of the aggregated data is protected, while analytical usefulness of the aggregated data is preserved. The method including receiving, using a transceiver, aggregated data including time-series data collected over a period of time. Selecting, from a memory, a mapping for transforming a segment of the aggregated data of a predetermined size. Partitioning the aggregated data into a multiple data segments, each data segment is of the predetermined size. Transforming each data segment using the mapping to produce multiple transformed data segments, wherein each data segment is transformed by the mapping independently from other data segments. Finally, transmitting, using the transceiver, the multiple transformed data segments to a third party over a communication channel, (Continued)

wherein steps of the method are performed by a processor operatively connected with the memory and the transceiver.

16 Claims, 16 Drawing Sheets

(58) Field of Classification Search
USPC .......................................................... 726/30
See application file for complete search history.

(56) References Cited

U.S. PATENT DOCUMENTS

| | | | |
|---|---|---|---|
| 2008/0300879 A1* | 12/2008 | Bouchard | G06F 11/008 704/256 |
| 2011/0267202 A1 | 11/2011 | Efthymiou et al. | |
| 2011/0270453 A1 | 11/2011 | Kalogridis et al. | |
| 2011/0271352 A1 | 11/2011 | Kalogridis et al. | |
| 2013/0111596 A1* | 5/2013 | Rayes | H04L 41/28 726/26 |
| 2013/0154849 A1 | 6/2013 | Denic et al. | |
| 2014/0172854 A1* | 6/2014 | Huang | G06F 21/6245 707/737 |
| 2014/0336960 A1 | 11/2014 | Haghighat-Kashani et al. | |
| 2015/0235051 A1 | 8/2015 | Fawaz et al. | |
| 2015/0379275 A1 | 12/2015 | Fawaz et al. | |
| 2016/0004971 A1 | 1/2016 | Verkasalo | |
| 2016/0203333 A1 | 7/2016 | Fawaz et al. | |

FOREIGN PATENT DOCUMENTS

| | | |
|---|---|---|
| WO | 2015026384 A1 | 2/2015 |
| WO | 2015175141 A1 | 11/2015 |

OTHER PUBLICATIONS

Erdogdu, Murat A., and Nadia Fawaz. "Privacy-utility trade-off under continual observation." 2015 IEEE International Symposium on Information Theory (ISIT). IEEE, 2015.

Ghahrarnani, Zoubin, and Michael I. Jordan. "Factorial hidden Markov models." Machine learning 29.2-3 (1997): 245-273.

Kolter, J. Zico, and Matthew J. Johnson. "REDD: A public data set for energy disaggregation research." Workshop on Data Mining Applications in Sustainability (SIGKDD), San Diego, CA. vol. 25. 2011.

Sankar, Lalitha, S. Raj Rajagopalan, and Soheil Mohajer. "Smart meter privacy: A theoretical framework." IEEE Transactions on Smart Grid 4.2 (2013): 837-846.

Rajagopalan, S. Raj, et al. "Smart meter privacy: A utility-privacy framework." Smart Grid Communications (SmartGridComm), 2011 IEEE International Conference on. IEEE, 2011.

Zeifman, Michael, Craig Akers, and Kurt Roth. "Nonintrusive Appliance Load Monitoring (NIALM) for Energy Control in Residential Buildings: Review and Outlook." IEEE transactions on Consumer Electronics. 2011.

* cited by examiner

METHOD AND SYSTEMS USING PRIVACY-PRESERVING ANALYTICS FOR AGGREGATE DATA

FIELD

The present disclosure relates to methods and systems for transmitting user aggregate data, and more particularly to privacy protection of the user aggregated data before transmitting to a third party, while preserving the analytical usefulness of the aggregated data.

BACKGROUND

For many consumers, the collection of user data raises privacy concerns because such data is particularly associated with information that a user may deem sensitive and wants to keep private. The problem for consumers is that consumer service providers have access to their private information including personal behavior and lifestyle (such as, appliance use, eating and sleeping patterns, occupancy patterns, household activity patterns), health status, household make-up, mobility patterns and the like. The collection of data by the consumer service provider can happen without the user consent or potentially without a possibility for the user to opt-out. The consumer service provider collecting the user's data is likely to make this data available to third parties, either without the user's knowledge and/or without the user knowing the extent of the collected data in terms of their personal privacy. Typically, consumers trust their consumer service provider collecting the data, but do not trust the third-party with whom the consumer service provider may share the consumer's collected data.

Specifically, this problem of protecting consumer/user privacy data goes to the control over service providers and third-party's access to their use personal data. In particular, releasing personal information which is considered private to the consumer.

Some conventional solutions for protecting consumer's personal data, include modifying the consumer's privacy data prior to releasing the consumer's data to third party. Such methods are usually referred as data anonymization methods aiming for protecting the consumer's privacy data while preserving an analytical usefulness of the data.

For example, some methods use non-intrusive appliance load monitoring to modify the aggregate energy data such that privacy of the energy data is protected, while analytical usefulness of the energy data is preserved. However, such methods require the actual states of the power consuming devices consuming the energy. Specifically, such methods require the actual state of a device, i.e., whether the device is turned ON or turned OFF, at a specific point of time when the energy data is collected. These conventional methods requiring the actual state of the device presents many problems because sensors are needed to be connected to each consuming device that consumes energy for each client, which is economically infeasible or even prohibitive in view of the privacy constraints.

Accordingly, there is a need for a data anonymization method that can minimize or avoid the usage of the actual state of the device producing the data.

SUMMARY

According to embodiments of the present disclosure to provide a system and a method for transmitting aggregated data to a third party, such that a privacy of the aggregated data is protected, while analytical usefulness of the aggregated data is preserved.

According to some embodiments of the present disclosure to provide such a method that can reduce or avoid the use of the actual state of the device producing the aggregated data. For example, one embodiment configured for the field of energy disaggregation, modifies the energy data collected from a set of power consuming devices over a period of time without using the knowledge of the actual state of the power consuming devices.

Some embodiments of the present disclosure are based on recognition that a statistical model of the states of the power consumption device is available, various optimization methods can be used to produce a mapping between the original aggregated data and the data that protects the privacy of the aggregated data, while preserving their usefulness. However, the training of such a statistical model can require the knowledge of actual states of the power consumption devices, which can be undesirable. However, some embodiments are based on realization that the knowledge of the actual state of the devices, such as power consumption devices, can be reduce or even avoided by assuming the power consuming devices are in a steady state during the time duration of the collected data, that is, the distribution between the hidden variables (e.g., appliance states) and observed data (e.g., aggregate energy consumption) in a one-time duration is the same as the distribution for another time duration. However, in order to make this stationarity property assumption, the duration of time for collecting the data needed to be increased, e.g. or lengthened, resulting in a large amount of data or big data. The reason for needing large amounts of time-series data is that enough data needs to be collected over a span of time to accommodate for stationary behavior across the time duration in the data. To that end, the aggregated data may need to be collected over days, weeks, months or even several months resulting in collecting thousands or hundreds of thousands of the samples of the aggregated data. Unfortunately, running the optimization to create a mapping for such a huge data collection of data samples can be computationally prohibitive/impractical.

However, some embodiments are based on another realization that, for the stationary data, the different segments of the data can be transformed independently using the same mapping. This is because the same statistical distribution is applicable to different segments, which allows the same optimized mapping to be applied across these different segments. To that end, some embodiment determining a mapping specifically for a segment of the aggregated data, and reuse the same mapping for different data segments. In such a manner, the assumption of the stationarity of the data can help to first avoid the need for the knowledge of the actual states of the power consumption devices and also simplifies the computational burden caused by such an assumption, which in turn save the memory and computational resources for data anonymization computing device.

According to an embodiment of the present disclosure, a method for transmitting user aggregate data to a third party, such that a privacy of the aggregated data is protected, while analytical usefulness of the aggregated data is preserved. The method including receiving, using a transceiver, aggregated data including time-series data collected over a period of time. Selecting, from a memory, a mapping for transforming a segment of the aggregated data of a predetermined size. Partitioning the aggregated data into a multiple data segments, each data segment is of the predetermined size.

Transforming each data segment using the mapping to produce multiple transformed data segments, wherein each data segment is transformed by the mapping independently from other data segments. Finally, transmitting, using the transceiver, the multiple transformed data segments to a third party over a communication channel, wherein steps of the method are performed by a processor operatively connected with the memory and the transceiver.

According to another embodiment of the present disclosure, a method for transmitting user aggregate data to a third party, such that a privacy of the aggregated data is protected, while analytical usefulness of the aggregated data is preserved. The method including receiving, using a transceiver, aggregated data including time-series data collected over a period of time. Selecting, from a memory, a mapping based on stationarity criteria and subject to a distortion constraint, for transforming a segment of the aggregated data of a predetermined size, wherein the selecting of the mapping is from a set of mappings stored in the memory using a property of the received aggregated data, wherein each mapping from the set of mapping is determined for a different steady state of the aggregated data. Partitioning the aggregated data into a multiple data segments, each data segment is of the predetermined size. Transforming each data segment using the mapping to produce multiple transformed data segments, wherein each data segment is transformed by the mapping independently from other data segments, and each mapped data segment of the aggregated data protects privacy of the aggregate data of the segment, while preserving analytical usefulness of the mapped data segment of the aggregated data. Finally, transmitting, using the transceiver, the multiple transformed data segments to a third party over a communication channel, wherein steps of the method are performed by a processor operatively connected with the memory and the transceiver.

According to another embodiment of the present disclosure, a system for transmitting user aggregate data to a third party, such that a privacy of the aggregated data is protected, while analytical usefulness of the aggregated data is preserved. The system including a transceiver for receiving aggregated data including time-series data collected over a period of time over a communication channel. The system further includes a memory to store at least one mapping for transforming a segment of the aggregated data of a predetermined size. The system also includes a processor operatively connected with the memory and the transceiver, the process is configured for: selecting, from the memory, a mapping for transforming a segment of the aggregated data of a predetermined size from the at least one mapping, partitioning the aggregated data into a multiple data segments, each data segment is of the predetermined size, transforming each data segment using the mapping to produce multiple transformed data segments, wherein each data segment is transformed by the mapping independently from other data segments, and transmitting, using the transceiver, the multiple transformed data segments to a third party over the communication channel.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
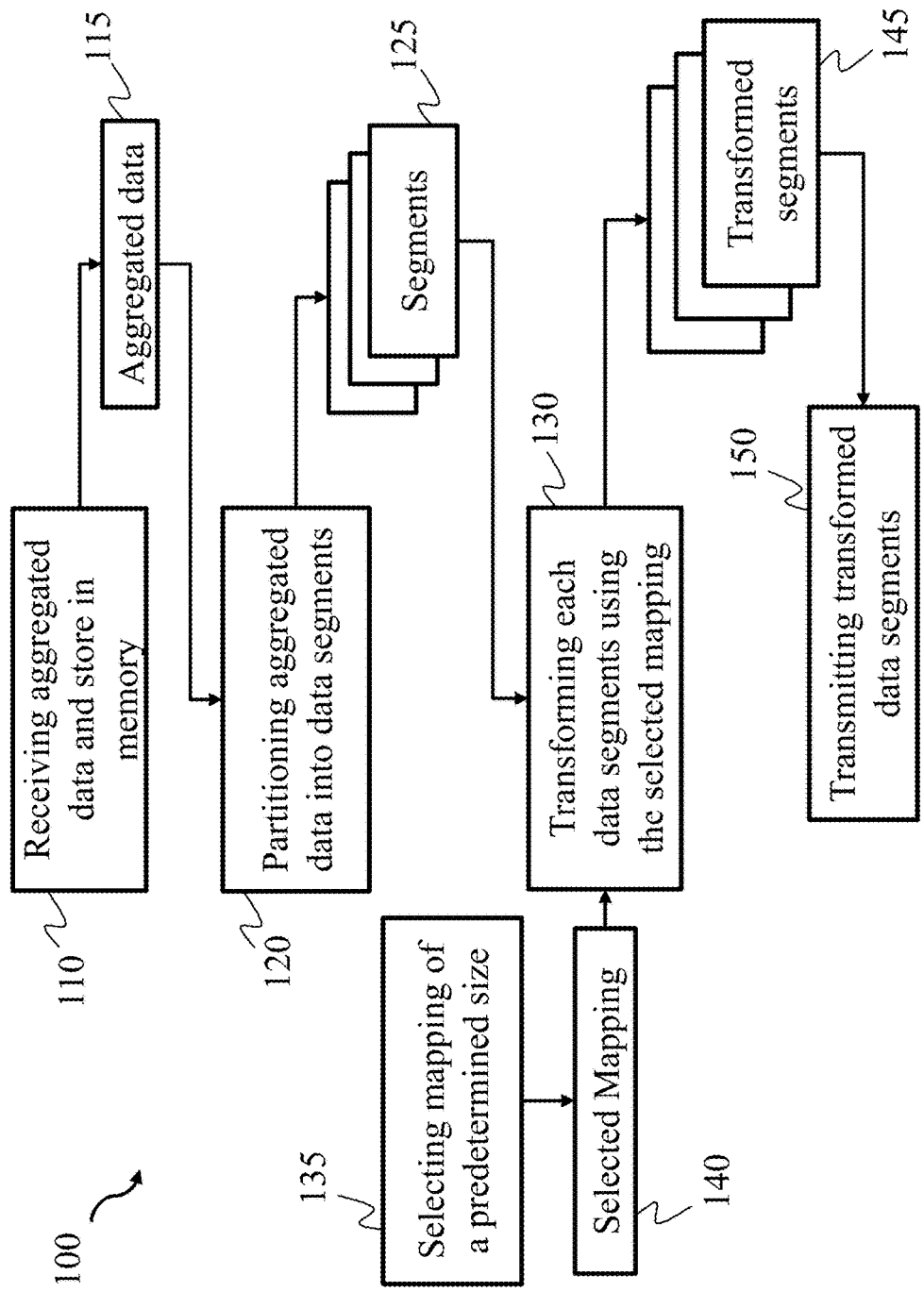
FIG. 1 is a block diagram of a method for transmitting aggregated data to a third party, such that a privacy of the aggregated data is protected, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram of a method according to an embodiment of the present disclosure. Step 110 shows the aggregate data received or acquired using a transceiver. The aggregate data includes time-series data collected over a period of time. The aggregate data may be received wireless or wired to a device in communication with the transceiver and stored in a computer readable memory. The aggregated data may also be collected via the processor via real time data up to a delay of the segment length.

The aggregate data can be collected via sensing apparatus connected to the processor. For example, for a household energy monitoring application, this may be a smart meter that records the total household energy usage over time or some other type of measuring device. The aggregate energy data sequence is denoted by $Y_1, Y_2, \ldots, Y_T$, where T is the length of the sequence (in terms of the number of time steps sampled). We let M denote the number of underlying devices that consume energy and label the devices with $\{1, \ldots, M\}$. For each $t \in \{1, \ldots, T\}$ and $m \in \{1, \ldots, M\}$, we let $s_{m,t}$ denote the operational state of device m at time step t. For each device in $m \in \{1, \ldots, M\}$, the sequence $S_{m,1}, S_{m,2}, \ldots, S_{m,T}$ denotes its operational states over time. A statistical model is employed to describe the statistical relationship between the device states and the aggregate energy data. The aggregate data may be pre-processed depending upon the particular application.

The aggregate data in step 115 may include collected time-series data of a client for a particular consumer service from a consumer service provider. For example, types of consumer service providers may include residential/entities, energy/power providers and phone/communication providers. Other types of consumer service providers may include health related providers, i.e. health-monitoring devices, or a type of monitoring service provider that provides sensors in houses, offices, cars, handheld devices or the like. Users or clients of consumer service providers may be one or combination of individuals and entities.

Still referring to Step 115, the aggregate data can include usage of at least one power consumer by a user, wherein the at least one power consumer includes a structure, a part of a structure, an electronic device, a power consuming device or some combination thereof. Further, the multiple data segments of the aggregate data can refer to an ongoing and/or future power consumption event by a user having at least one power consumer. Noted, is the possibility of the aggregate data can originate from a user, and is user energy data collected using a metering device located on a consumer side of the metering device.

The aggregated data in step 120 is partitioned into data segments. For example, the aggregated data is partitioned into multiple aggregate data segments, each aggregate data segment is of a predetermined size. As noted above, computing large amounts of data for optimization is computationally impractical. Whereas, to overcome this technical problem, the aggregated data is segmented and then an individual data segment via step 125 can be computed. Thus, the individual data segment can be optimized for one or more different models, so that a mapping can be applied to the individual segment of the aggregate data.

Step 135 includes selecting of a mapping from a set of mappings. The selecting of the mapping can be determine using a statistical model, wherein a statistical model may be based on collecting a training data set from memory, then determining a statistical model fitting the training data set. The training data set is data that is statistically similar to the aggregated data, that is, a model learned from the training data set can be statistically representative of the aggregated data.

Still referring to Step 135, the mapping can be determined using the statistical model by optimizing a balance between one or more criteria for protecting privacy of the transformed aggregated data and one or more criteria of analytical usefulness of the transformed aggregated data. The criteria of analytical usefulness can be some threshold criteria in order to provide for third party analytics of the transformed aggregated data by a third party. For example, the client's aggregate energy data that includes the underlying device usage patterns can be statistically modeled with a Factorial Hidden Markov Model (FHMM). The FHMM model assumes that each device sequence is independent and forms a Markov chain, which is statistically captured by initial state and transition distributions. At each time t, the aggregate energy consumed in time step t, denoted by $Y_t$, depends on the operational states of all of the devices at time t, denoted by $S_{1,t}, \ldots, S_{M,t}$, as statistically captured by an emission distribution.

Generally, the statistical model chosen can be applicable to the particular application, while capturing the structure of the data in a manner that represents similarities across different time segments, which allows the application of the same mapping across these different time segments. For example, the distributions describing the FHMM model that capture the client's aggregate energy data are learned from training data. Specifically, this could be done by estimating the parameters of the initial state, transition and emission distributions. The training data could be sourced from the client in an initial training phase used to calibrate the system, or could be obtained from other sources that have similar statistical properties (e.g., other households with similar statistical properties to the client household). Temporal dependency, diurnal cycles and time-of-day effects can be captured by applying FHMMs with different parameters for different time segments.

The selected mapping 140 can be applied for each individual data segment independently, over the remaining segments of the aggregated data. Specifically, each data segment is transformed by the mapping independently from the other data segments, to produce a modified end-user aggregate data for all the segments, while preserving an analytical usefulness of the modified end-user aggregate data. Mapping generally refers to a randomized function that produces a random output depending on the given input.

The privacy-preserving mechanism is a random mapping that takes as input the energy data $Y_1, Y_2, \ldots, Y_T$ and produces modified energy data $Z_1, Z_2, \ldots, Z_T$. This mechanism is constructed by an optimization that aims to minimize the information leakage of the operating states of sensitive device(s) specified by the client while constraining the distortion of the energy data. The client specifies the subset of device(s) considered sensitive as denoted by $M \subset \{1, \ldots, M\}$. Let $x_t := s_{M,t}$ denote the operational states of the sensitive device(s) at time t. The general optimization is to minimize the information leakage of the sensitive device states from the processed data, as captured by the mutual information $I(X_1, \ldots, X_T; Z_1, \ldots, Z_T)$, subject to a distortion constraint, as captured by $D(Y_1, \ldots, Y_T; Z_1, \ldots, Z_T) \leq \delta$ for some distortion function D and distortion limit $\delta$, in order to construct the mechanism as a random mapping specified by the conditional distribution $P_{Z_1, \ldots, Z_T | Y_1, \ldots, Y_T}$. Note that this mechanism requires only the aggregate energy data as input. However, in order to improve the tractability of the construction for long data sequences, we can alternatively perform the optimization over mechanisms that split and operate on the data $Y_1, \ldots, Y_T$ over shorter time windows rather than the entire sequence at once.

For example, in the extreme of processing over windows of size one, the mechanism for each time step t is specified by $P_{Z_t | Y_t}$ and is constructed by the optimization of minimizing information leakage $I(X_t; Z_t)$ subject to the distortion constraint $D(Y_t; Z_t) \leq \delta$. When the data is split over shorter window sizes with mechanisms operating on each window independently, parallelized processing is enabled. Also, in the case of window size one, if stationarity of the FHMM model can be assumed (such as when temporal dependence is avoided in the transition distribution and the initial state distribution is assumed be the steady state of the transition distribution), then the marginal distributions $P_{X_t, Y_t}$ are identical across time steps t, which means that the mechanisms constructed by optimization $P_{Z_t | Y_t}$ will also be identical across time steps t. Further, by assuming the power consuming devices are in a steady state during the time duration of the user collected data, we also overcome the technical problem of requiring the consumer's "actual power consumption" or "actual state" as is the problem with known ESP methods, noted above.

In other words, in order to optimize a mechanism and apply it across multiple time durations of collected time-series data, we assumed that the data has a stationarity property, that is, the distribution between the hidden variables (e.g., appliance states) and observed data (e.g., aggregate energy consumption) in a one-time duration that is the same as the distribution for another time duration. The effect of this assumption increased the length of the time duration of the collected aggregate data, resulting in a large amount of data. This is because more data had to be collected over a longer span of time to accommodate for modeling some sort of cyclically stationary behavior across the time duration in the data. However, accommodating for more data over a longer period time created another technical problem of how to optimize the mechanism(s) using large amounts of data, because computing large amounts of data for optimization is computationally impractical.

The transformed data segments step 145 are the output produced by the selected mapping which was given the data segments as input. The transformed data segments or the modified aggregate data consists of the aggregated data with portions that are hidden from third party general analytics. The hidden portions of the aggregated data may be privacy related data as designated by the client or user of the data.

Finally, in step 150, the transformed data segments or the modified aggregate data can be transmitted to a consumer service provider, third party or the like. The modified aggregate data can be sent to the consumer service provider(s) and/or third parties, while limiting distortion using a suitable distortion metric and threshold, and preserving the general analytics usefulness. Also, because the aggregate data is used as an input, the mapping process can operate independently for each segment of the multiple segments of the aggregate data for sequential and/or parallel processing.

The term analytical usefulness may be understood as the process of evaluating data using analytical and logical reasoning to examine each component of the data provided. This form of analysis can be just one of the many steps that may be completed when conducting a research analysis of data. Data from various sources can be gathered, reviewed, and then analyzed to form some sort of finding or conclusion. There are a variety of specific data analysis methods, some of which include data mining, text analytics, business intelligence, and data visualizations. For example, regarding collected energy data from a client may include analytics for a benefit of the client and/or provider(s). A specific analytics objective of interest can be to determine the usage patterns of specific energy consuming device(s) (e.g., appliance(s) within a household), which may provide beneficial information to the client and/or provider, such as possibly aiding other services received by the client and/or performed by the provider (e.g., appliance operation information aiding a preventative maintenance/monitoring service, or providing marketing information). However, it may also be desirable to release an accurate representation of the energy consumption data to the provider(s) in order to enable later general analytics tasks not determined beforehand.

Figure 2:
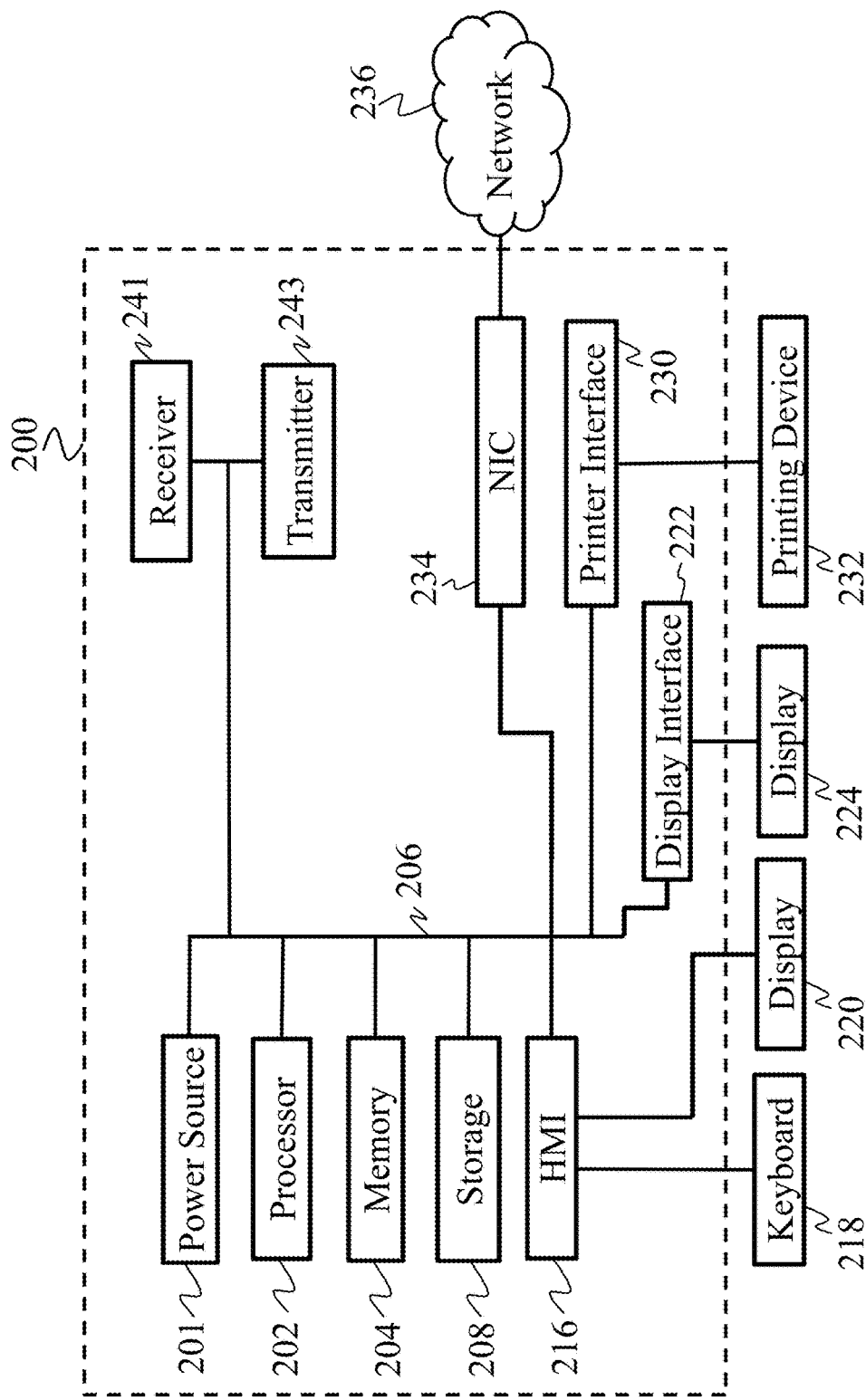
FIG. 2 is a block diagram of a computer system for transmitting aggregated data to a third party, in accordance with some embodiments of the present disclosure.

FIG. 2 is a block diagram of a computer system 200 for transmitting aggregated data to a third party, in accordance with some embodiments of the present disclosure. The computer system 200 is configured for modifying the aggregate data so as to protect a privacy of the aggregated data, while preserving analytical usefulness of the aggregated data in accordance with some embodiments of the present disclosure.

The computer system 200 includes a power source 201, depending upon the application the power source may be optionally located outside of the computer system. The computer system 200 includes a processor 202 configured to execute stored instructions, as well as a memory 204 that stores instructions that are executable by the processor. The processor 202 can be a single core processor, a multi-core processor, a computing cluster, or any number of other configurations. The processor 202 is connected through a bus 206 to one or more input and output devices. The memory 204 can include random access memory (RAM), read only memory (ROM), flash memory, or any other suitable memory systems.

Still referring to FIG. 2, the computer system 200 can also include a storage device 208 adapted to store supplementary data and/or software modules used by the processor. For example, the storage device 208 can store sets of mapping along with sets of parameters used by the processor to select a mapping to transform at least one segment of the aggregated data. Additionally, or alternatively, the storage device 208 can store historical data similar to the aggregate data. The storage device 208 can include a hard drive, an optical drive, a thumb-drive, an array of drives, or any combinations thereof.

A human machine interface 216 within the computer system 200 can connect the system to a keyboard 218 and display device 220. The computer system 200 can be linked through the bus 206 to a display interface 222 adapted to connect the system 200 to a display device 224, wherein the display device 224 can include a computer monitor, camera, television, projector, or mobile device, among others.

Still referring to FIG. 2, a printer interface 230 can also be connected to the computer system 200 through the bus 206 and adapted to connect the computer system 200 to a printing device 232, wherein the printing device 232 can include a liquid inkjet printer, solid ink printer, large-scale commercial printer, thermal printer, UV printer, or dye-sublimation printer, among others. A network interface controller 234 is adapted to connect the computer system 200 through the bus 206 to a network 236. The aggregate data or modified aggregate data, among other things, can be rendered on a display device, imaging device, and/or printing device.

The modified aggregate data, among other things, can be transmitted over a communication channel of the network 236, and/or stored within the computer's storage system 208 for storage and/or further processing. Further, the aggregate data may be received wirelessly or wire from a receiver 241 or transmitted via a transmitter 243 wirelessly or wire, the receiver and transmitter are both connected to the computer system 200 through the bus 206.

Figure 3:
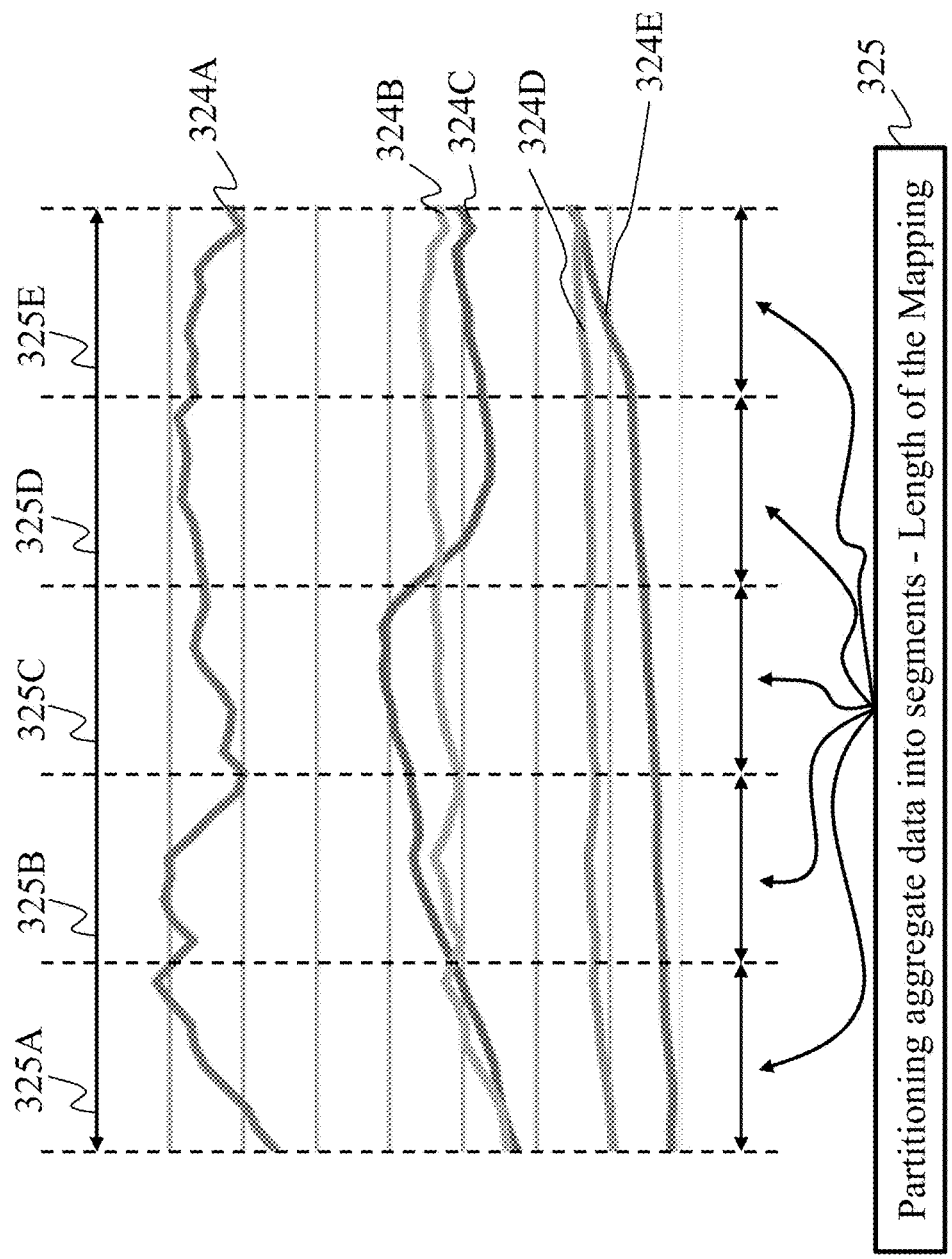
FIG. 3 is a graph regarding partitioning of the aggregated data into multiple aggregate data segments, in accordance with some embodiments of the present disclosure.

FIG. 3 is a graph regarding partitioning of the aggregated data into multiple aggregate data segments, in accordance with some embodiments of the present disclosure. The aggregated data is partitioned 325 into segments 325A-E across time, each consisting of data collected 324A-E within a portioned time segment. These different time segments may be aligned with natural temporal patterns (e.g., diurnal cycles, days of the week, etc.). In some embodiments, the same mapping may be applied to different segments with similar statistical characteristics. Alternatively, in some other embodiments different mappings may be applied to different segments depending on the different statistical characteristics.

Figure 4A:
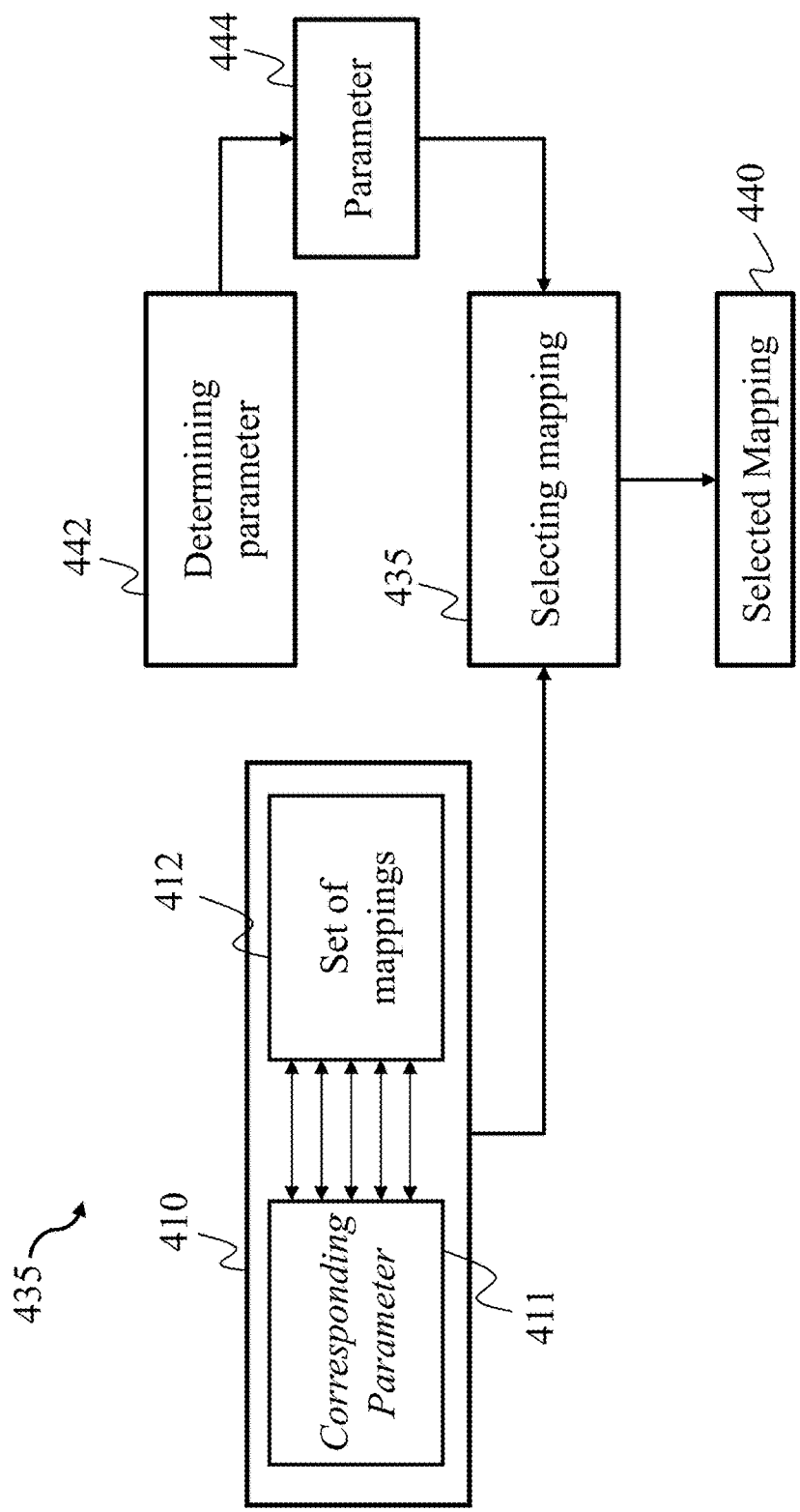
FIG. 4A is a block diagram of the selecting process further detailing the selection process in selecting a mapping from a set of mappings, in accordance with some embodiments of the present disclosure.
Figure 4B:
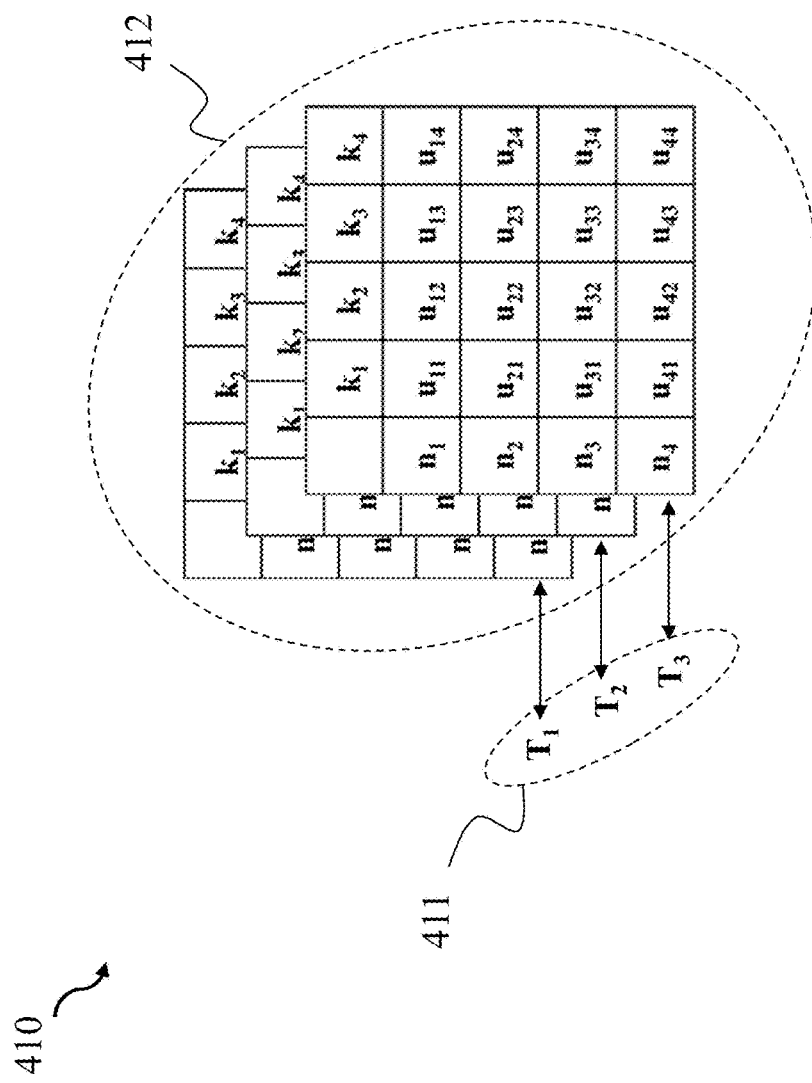
FIG. 4B is an illustration of selecting a mapping from a set of mapping, in accordance with some embodiments of the present disclosure.

FIG. 4A and FIG. 4B further disclose the selecting process in selecting a mapping from a set of mappings, in accordance with some embodiments of the present disclosure. FIG. 4A is a block diagram of the selecting process in selecting a mapping from a set of mappings. For each segment of aggregated data, a parameter 444 is determined 442 for that data segment, and then a mapping is selected 435 from the collection of mappings 410 based the determined parameter 444 and the parameters corresponding to the mappings 411. The parameter 444 is to capture the distinct statistical characteristics of the data segment. For example, this parameter could indicate the time the data segment was collected to indicate the applicable statistical properties based on the time of day (e.g., diurnal patterns, etc.). The parameters 411 corresponding to the set of mappings 412 may capture which distinct statistical characteristics that each of the corresponding mappings are applicable to. The process of selecting a mapping 435 for a particular data segment is to select the mapping from set of mappings 412 with a corresponding parameter 411 that is most applicable to the parameter 444 determined for that data segment. The selected mapping 440 is then to be applied to the data segment.

FIG. 4B is an illustration of the collection of mappings 410, which consists of the set of mappings 412 and their corresponding parameters 411, in accordance with some embodiments of the present disclosure. Each mapping within the set of mappings 412 has a corresponding parameter 411 capturing the distinct statistical characteristics that the mapping is applicable too.

Still referring to FIG. 4A and FIG. 4B, contemplated is the possibilities that different models may correspond to different types of households (e.g., demographics, appliances owned, etc.) and could capture general changes in household behavior across time that are not regularly cyclical or easily predicted from time of day/week (e.g., vacations, changes in appliances owned, changes in occupants and their behavior/routines). Further, it is possible that retrieving from the memory a set of statistical models, each model corresponds to the mapping from the set of mappings, and then fitting the received aggregated data into each statistical model to determining a fitting error for each statistical model; and selecting the mapping from the set of mapping that corresponds to the statistical model with the smallest fitting error.

Figure 5:
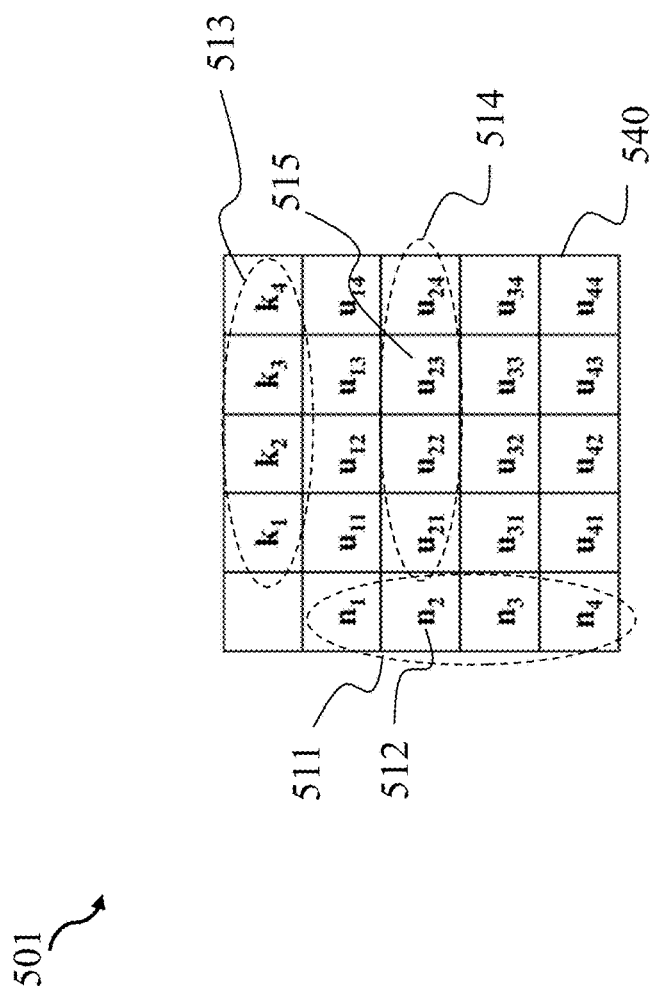
FIG. 5 is an illustration of transforming each data segment using the selected mapping from the set of mappings, in accordance with some embodiments of the present disclosure.

FIG. 5 is an illustration of transforming each data segment using the selected mapping 540 from the set of mappings, in accordance with some embodiments of the present disclosure. The selected mapping 540 lists each possible input data segment 511. For the specific input data segment 512, an output from the possible output data segments 513 is randomly selected according to the probabilities listed in the row of probabilities 514 corresponding to the specific input data segment 512. Each value 515 in the row of probabilities 514 is the probability that the random output is be assigned to the corresponding outputs 513.

Figure 6:
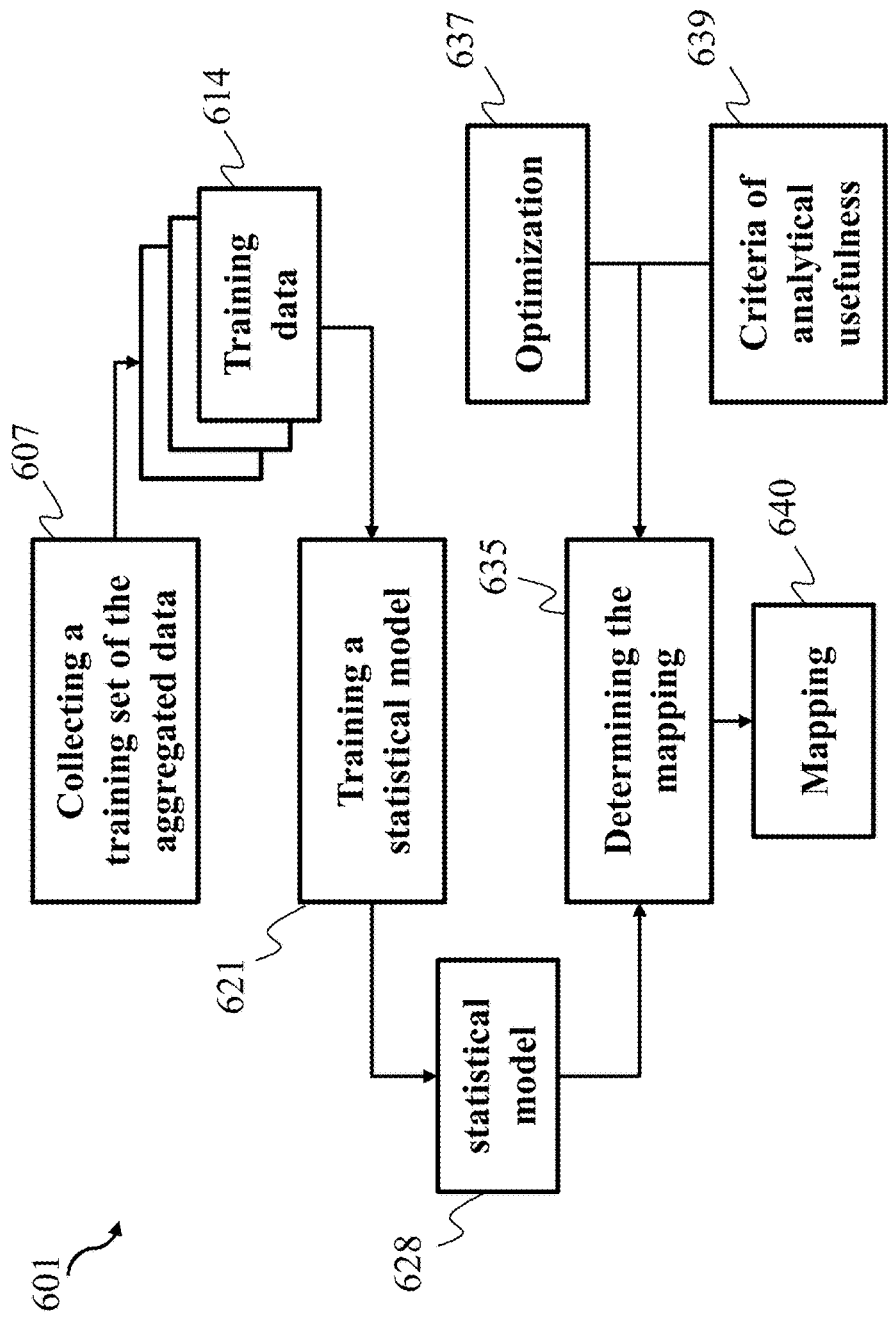
FIG. 6 is a block diagram of determining a mapping from a training model, in accordance with some embodiments of the present disclosure.

FIG. 6 is a schematic of determining a mapping from a training data in accordance with some embodiments of the present disclosure. The process of determining the mapping 601 from the training data consists of collecting a training set of the aggregated data 607, training a statistical model 621 from the collected training data 614, and determining the mapping 635 from trained statistical model 628 to produce the mapping 640.

Figure 7A:
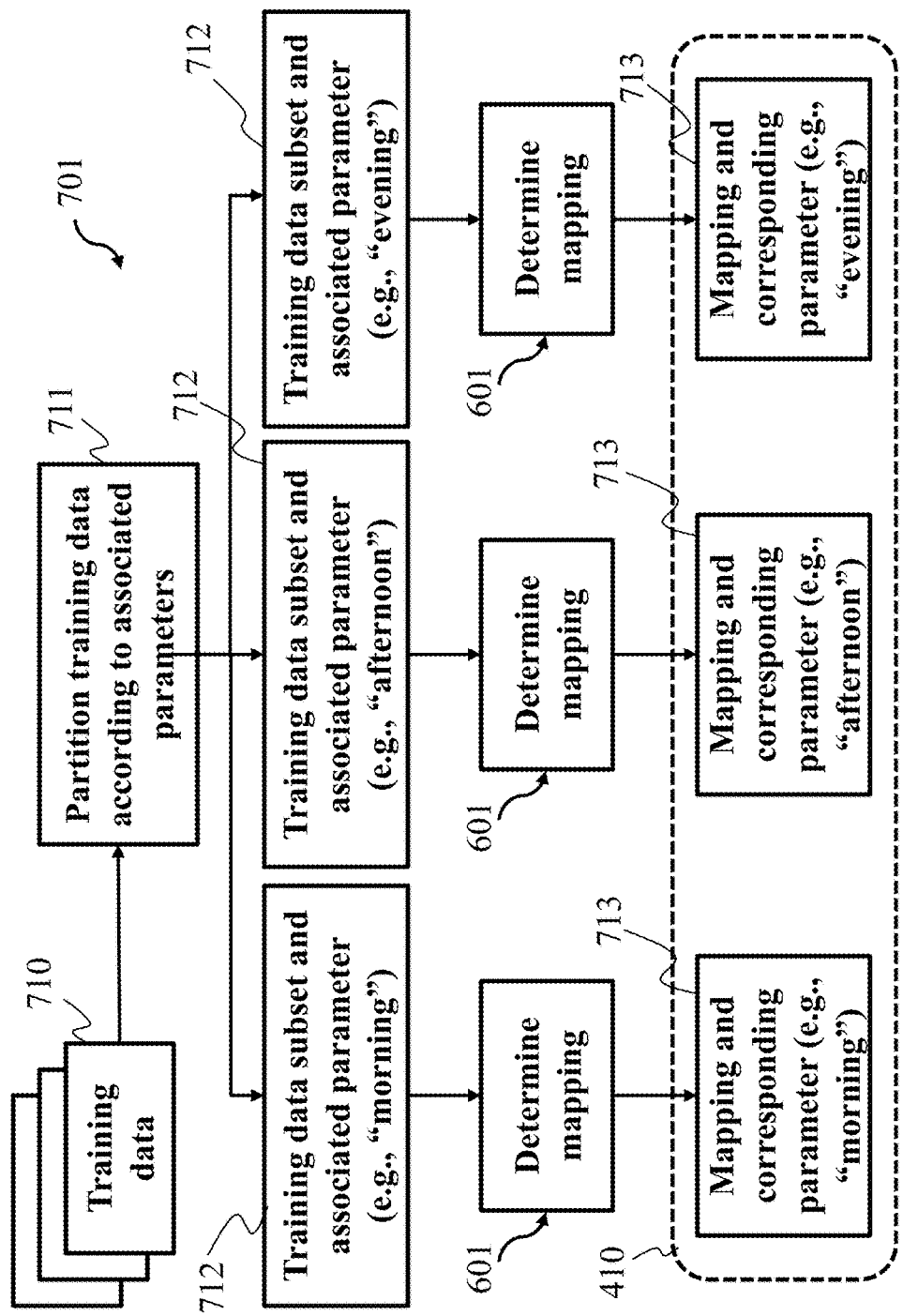
FIGS. 7A, 7B, and 7C are illustrations of determining a set of mappings from training data, in accordance with some embodiments of the present disclosure.
Figure 7B:
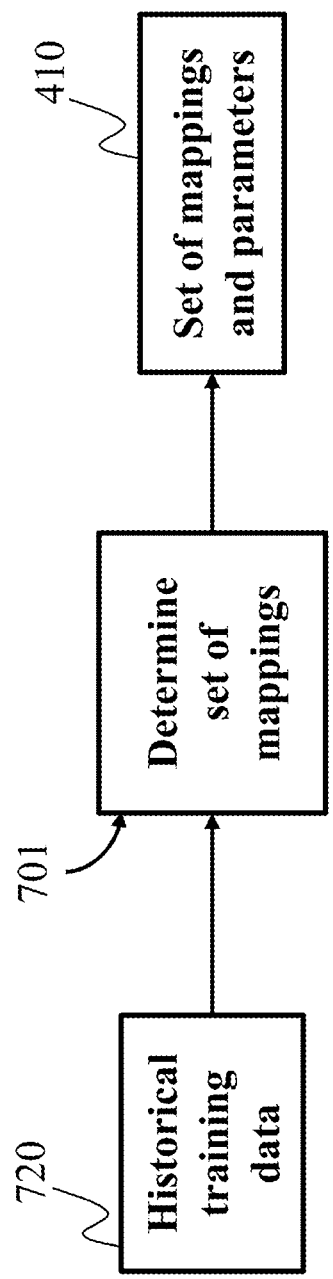
Figure 7C:
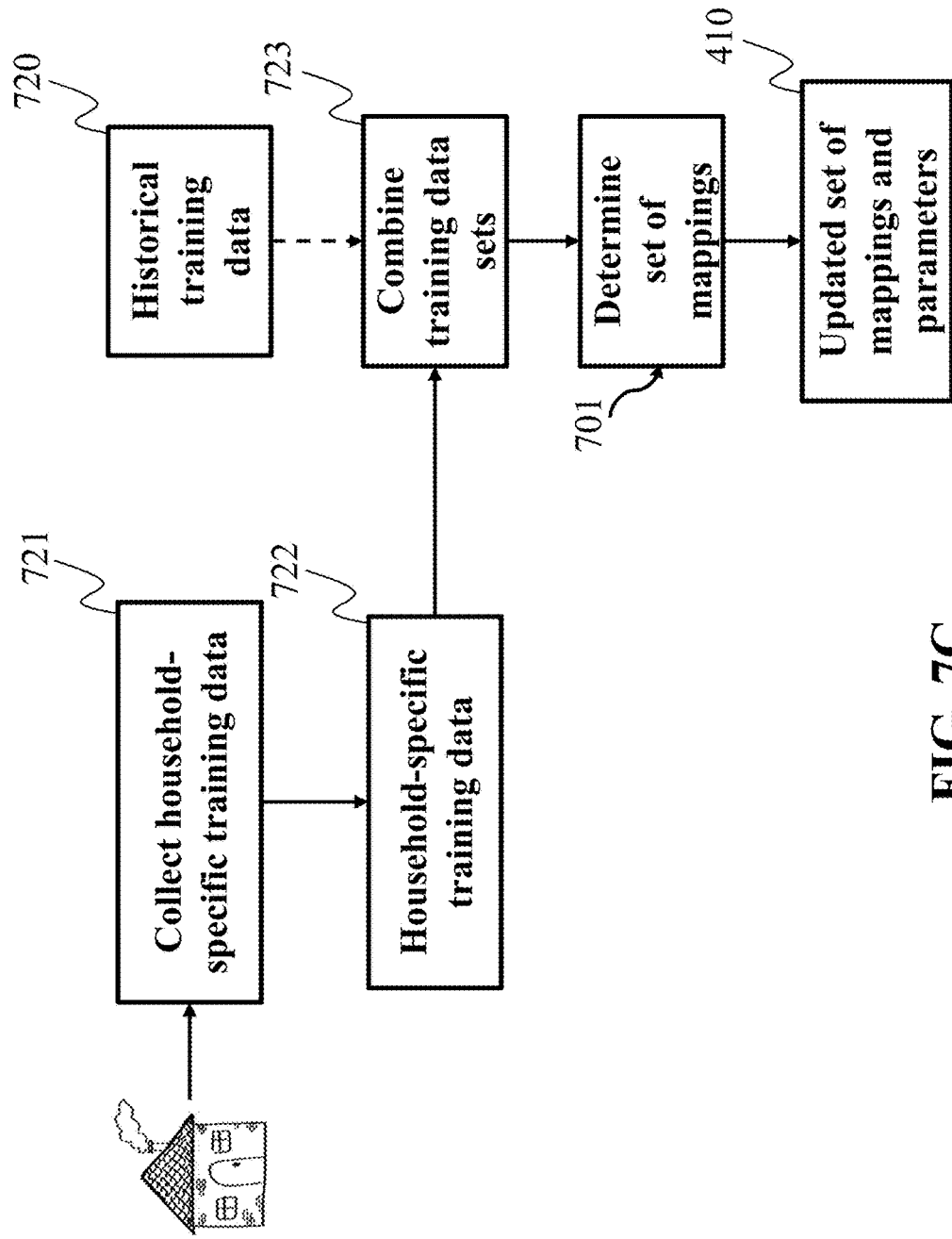

FIGS. 7A, 7B, and 7C are illustrations of determining a set of mappings from training data. FIG. 7A illustrates the process of determining the set of mappings 701 to produce the set of mappings 410 from a training data 710, where first the training data 710 is partitioned 711 according to associated parameters into subsets of the training data with an associated parameter 712, then the process of determining a mapping 601 is applied to each of these subsets to determine the mapping for each associated parameter 713.

FIG. 7B illustrates the process of applying the process of determining the set of mappings 701 to historical training data 720 to determine the set of mappings and parameters 410.

FIG. 7C illustrates the process of collecting household specific training data 721 to obtain a household specific training data set 722 that is optionally combined 723 with historical training data 720, which is then used as input to the process of determining the set of mappings 701 in order to produce the updated set of mappings and parameters 410.

Figure 8:
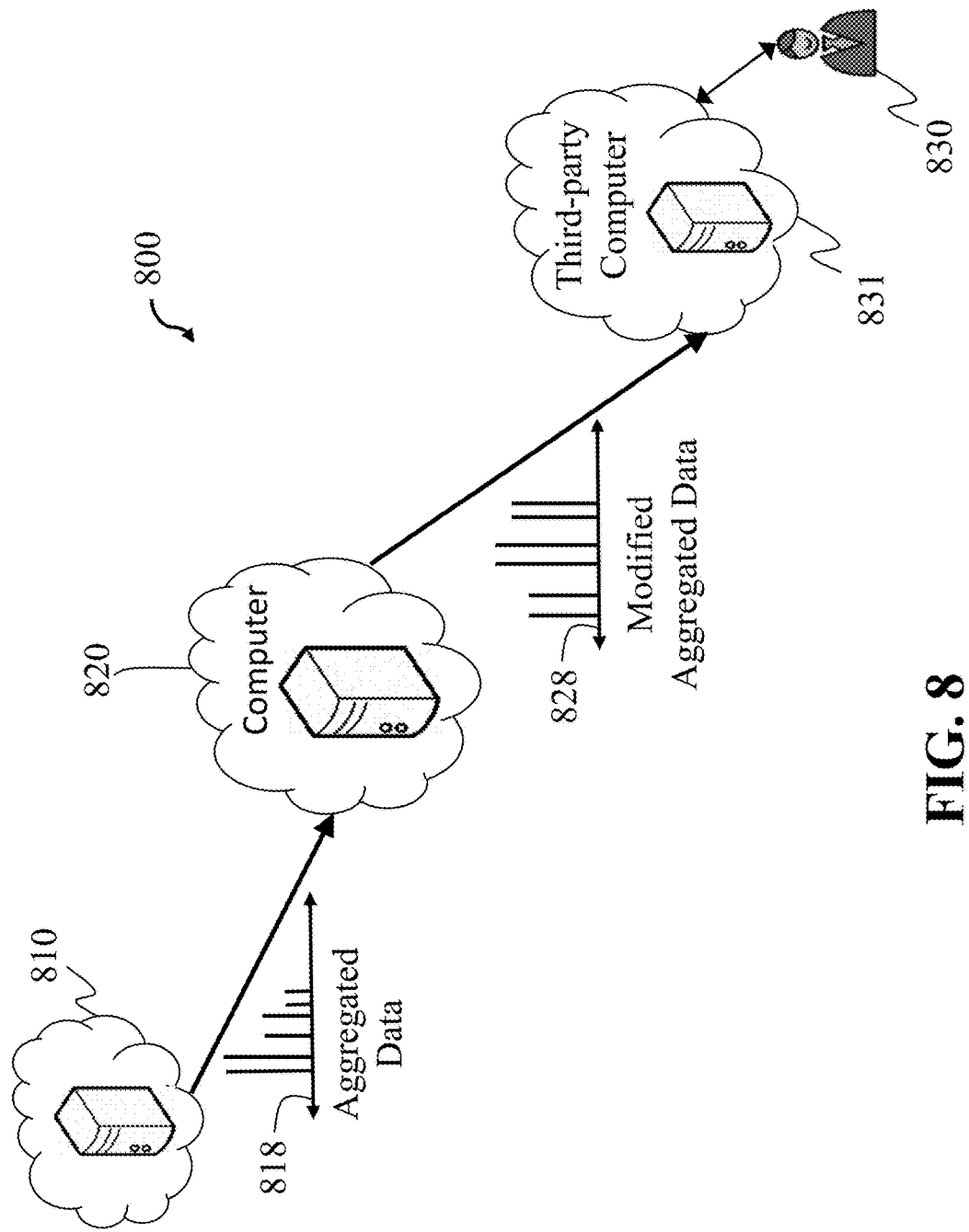
FIG. 8 is a flow diagram of a method for transmitting aggregated data to a third party, such that a privacy of the aggregated data is protected, according to embodiments of the present disclosure.

FIG. 8 shows is a schematic of a method 800 for transmitting aggregated data to a third party, such that a privacy of the aggregated data is protected, according to embodiments of the present disclosure. FIG. 8 shows a computer system 820 having a memory, a processor and a transceiver. The transceiver of the computer 820 receives the aggregated data 818 from a source computer 810 and stores the aggregated data 818 in the memory of the computer system 820. Wherein the computer system 820 transforms the aggregated data 818 into a modified aggregated data 828, and sends the modified aggregated data 828 to a third party computer 831 of the third party 830.

Figure 9:
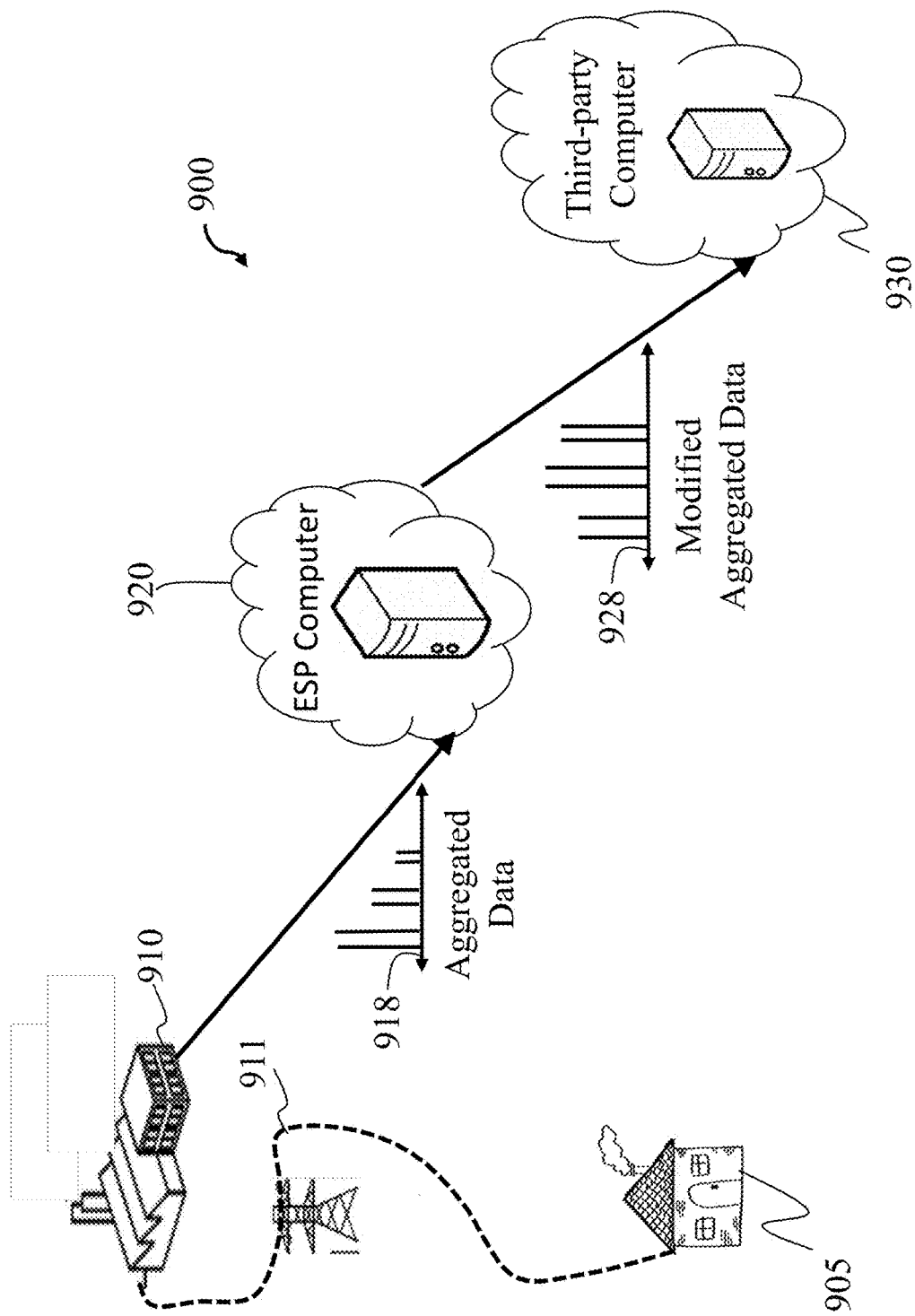
FIG. 9 shows is a schematic of another a method for transmitting aggregated data to the third party, similar to FIG. 8, according to embodiments of the present disclosure.

FIG. 9 shows is a schematic of another a method 900 for transmitting aggregated data to the third party, similar to FIG. 9, according to embodiments of the present disclosure. Wherein the source 910 may be Energy Service Provider (ESP) that provides energy 911 to a client 905 that has at least one power consumer 905, such as a house 905. The ESP 910 collects the client's energy use over a length of time and formulates the client's aggregate data 918 which is stored on the ESP computer 920. Wherein the ESP computer 920 transforms the aggregated data 918 into a modified aggregated data 928, and sends the modified aggregated data 928 to a third party computer 931.

Figure 10:
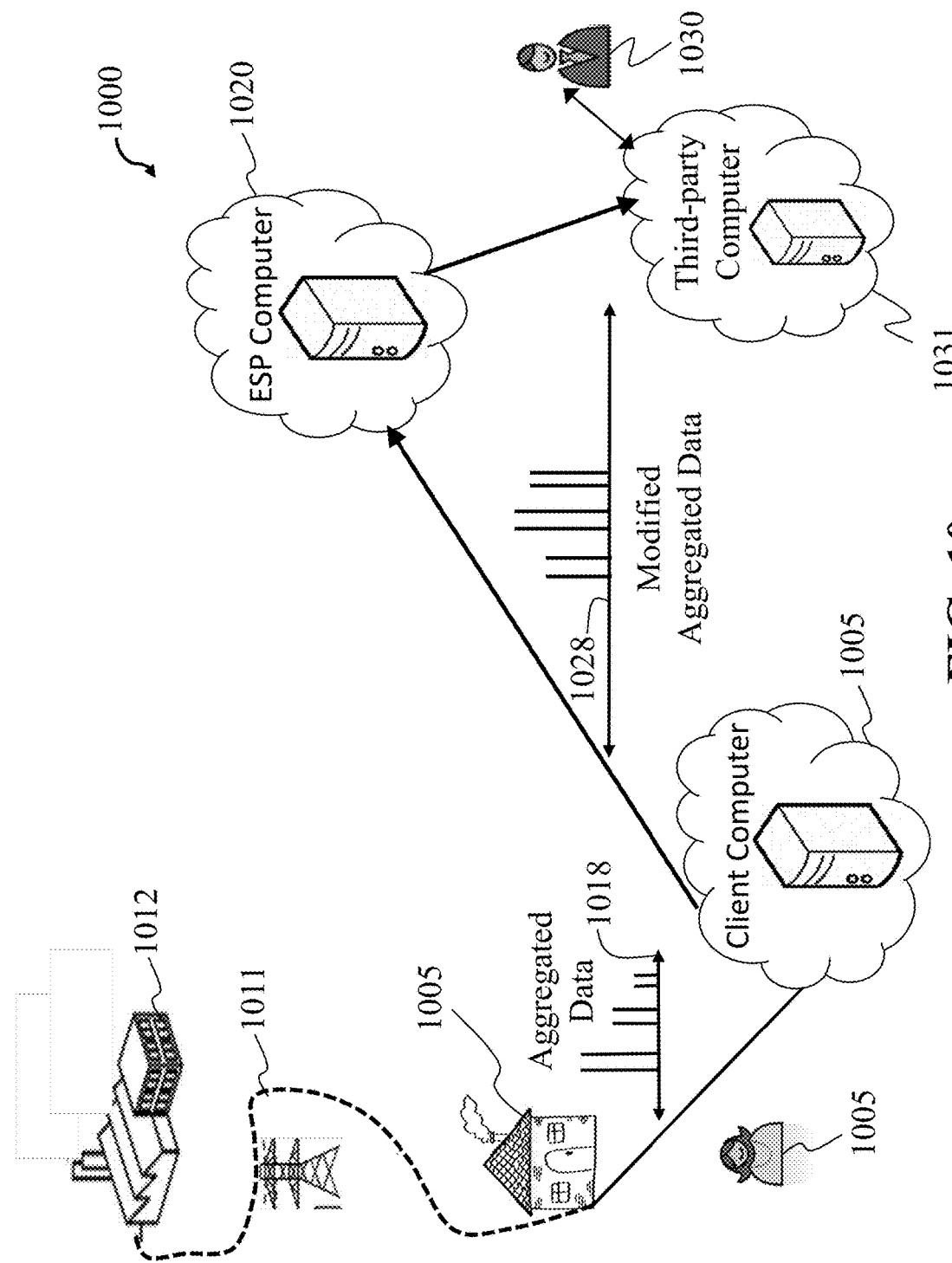
FIG. 10 shows is a schematic of another method for transmitting aggregated data to the third party, according to embodiments of the present disclosure.

FIG. 10 shows is a schematic of another method 1000 for transmitting aggregated data to the third party, similar to FIG. 8 and FIG. 9, according to embodiments of the present disclosure. Wherein the source 1010 may be a client 1005 having a client computer 1005 that is in communication with a ESP computer 1020, and in further communication with a third party computer 1031 of a third party 1030. The client's house 1005 collects the client's energy use over a length of time and formulates the client's aggregate data 1018, which is stored on the client's computer 1005. Wherein the aggregate data 1018 is transformed into a modified aggregated data 1028 and sent to the ESP's computer 1020, which the ESP's computer 1020 sends the modified aggregated data 1028 to the third party computer 1031 of the third party 1030.

For example, the aggregate data can originate from a user as energy data collected by the user using a user metering device or a user measuring device located on a user side of a third party metering device, such that the user transmits, using a user transmitter, the transformed aggregated data to the third party over a user communication channel, wherein steps of the method are performed by the processor operatively connected with the user transmitter.

Figure 11A:
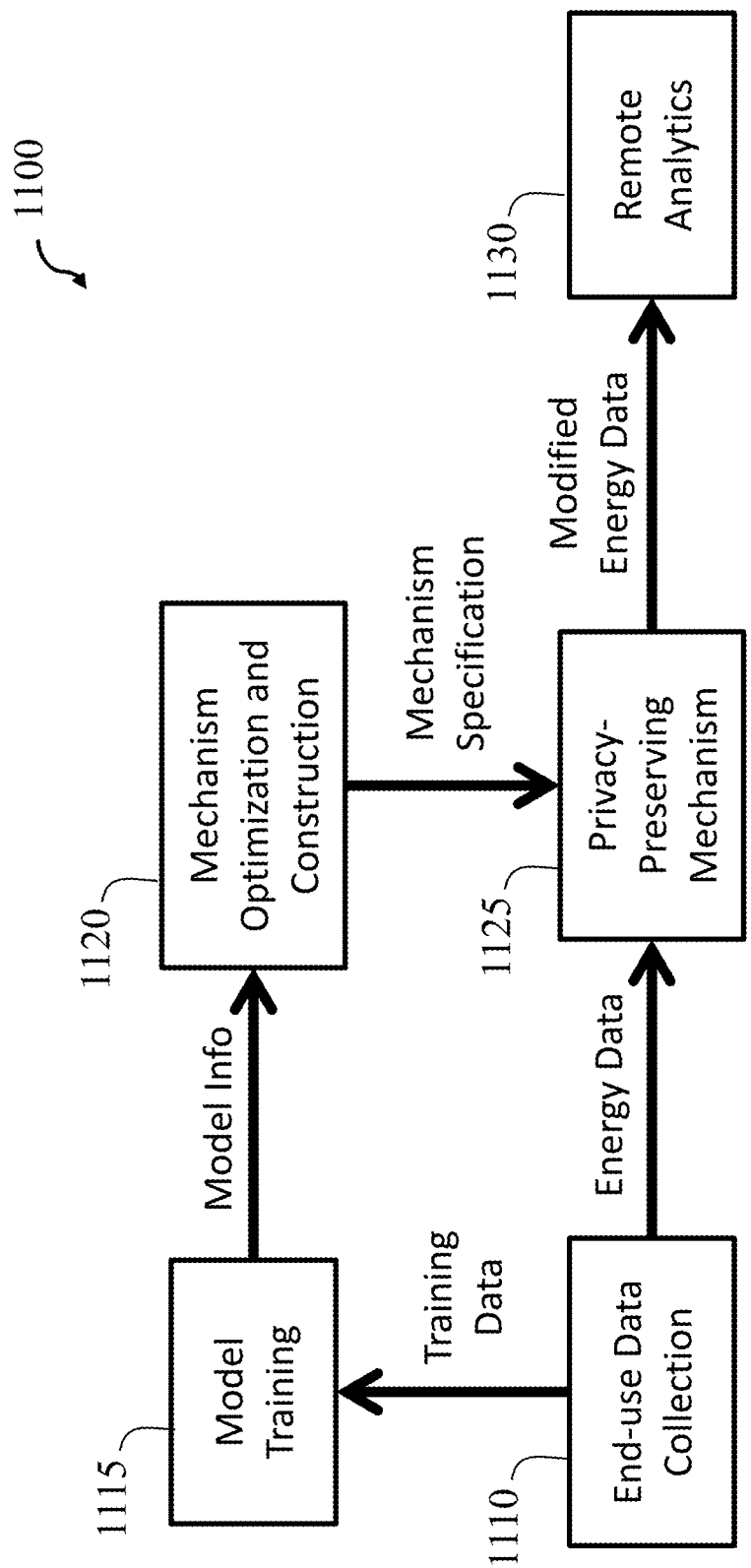
FIG. 11A is a flow diagram of a method for transmitting aggregated data to a third party, according to embodiments of the present disclosure.

FIG. 11A is a flow diagram of a method 1100A for transmitting aggregated data to a third party, according to embodiments of the present disclosure. Step 1110 includes the collection of aggregate data. Step 1115 is the training model that uses the aggregate data of step 1110 and/or historical data, so as to determine a statistical model that can be used in the mechanism for optimization and construction. Step 1120 includes the optimization and construction mechanism for using the model to estimate parameters to be used in modifying the aggregate data via the privacy-preserving mechanism. Further, the model may be updated based on the received aggregated data; and updating the mapping may be based on the updated statistical model. Step 1125 includes the privacy-preserving mechanism, wherein the aggregate data is transformed into a modified aggregate data prior to be emitted to a third party. Step 1130 includes third parties receiving the modified aggregate data for remote analytics.

Still referring to FIG. 11A, there is the possibility of selecting a mapping from a set of mappings stored in the memory using a property of the received aggregated data, wherein each mapping from the set of mapping can be determined for a different steady state of the aggregated data. Further, wherein the property of the received aggregated data is one of: a time property of the period of time including one or combination of a length of the period of time, a timing of the period of time and a season of the period of time, and a time property related to a behavioral use property considered as privacy data of the period of time. Wherein a behavioral use property may include one or a combination of: effects from natural geographic events related to weather specific to regional specialties, such as water, mountains or dessert.

Figure 11B:
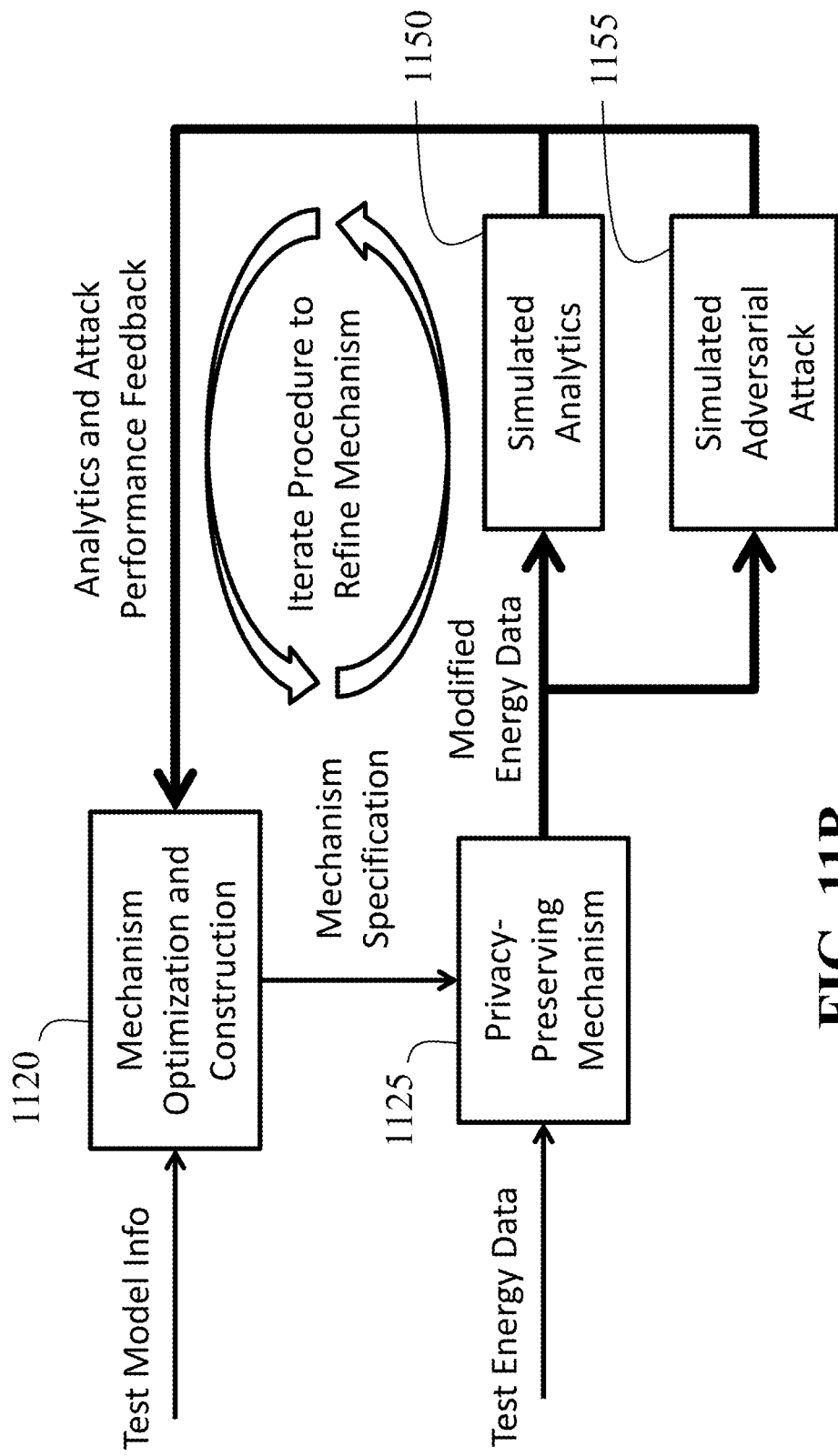
FIG. 11B is a flow diagram of a method for transmitting aggregated data to a third party providing an analysis of performance of the method, according to embodiments of the present disclosure.

FIG. 11B is a flow diagram of the method 1100 of FIG. 11A that further includes an iterate procedure having a refine mechanism, according to embodiments of the present disclosure. Step 1120 receives the test model information into the mechanism for optimization and construction, and the model estimates parameters to be used in modifying the aggregate data via the privacy-preserving mechanism 1125. Step 1125 includes the privacy-preserving mechanism, wherein the aggregate data is transformed into a modified aggregate data prior to being evaluated.

Regarding steps 1150 and 1155, the privacy-preserving mechanism can be evaluated against the desired analytics tasks and potential privacy attacks. The analytics and privacy performance can be fed back into the optimization stage 1140, such as by tuning the distortion metric D and/or threshold δ to construct mechanisms with better evaluated performance. As an example, to evaluate the analytics performance, it is possible to measure the accuracy of the provider(s) in recovering the operational patterns of specific useful device(s). As an example, to evaluate the privacy performance, we could measure the accuracy of an attacker, with the released data and model knowledge, in recovering the operational patterns of the sensitive device(s). Accordingly, this evaluation can be conducted through theoretical simulations based on the estimated statistical model or through empirical analysis based on testing data.

Figure 12:
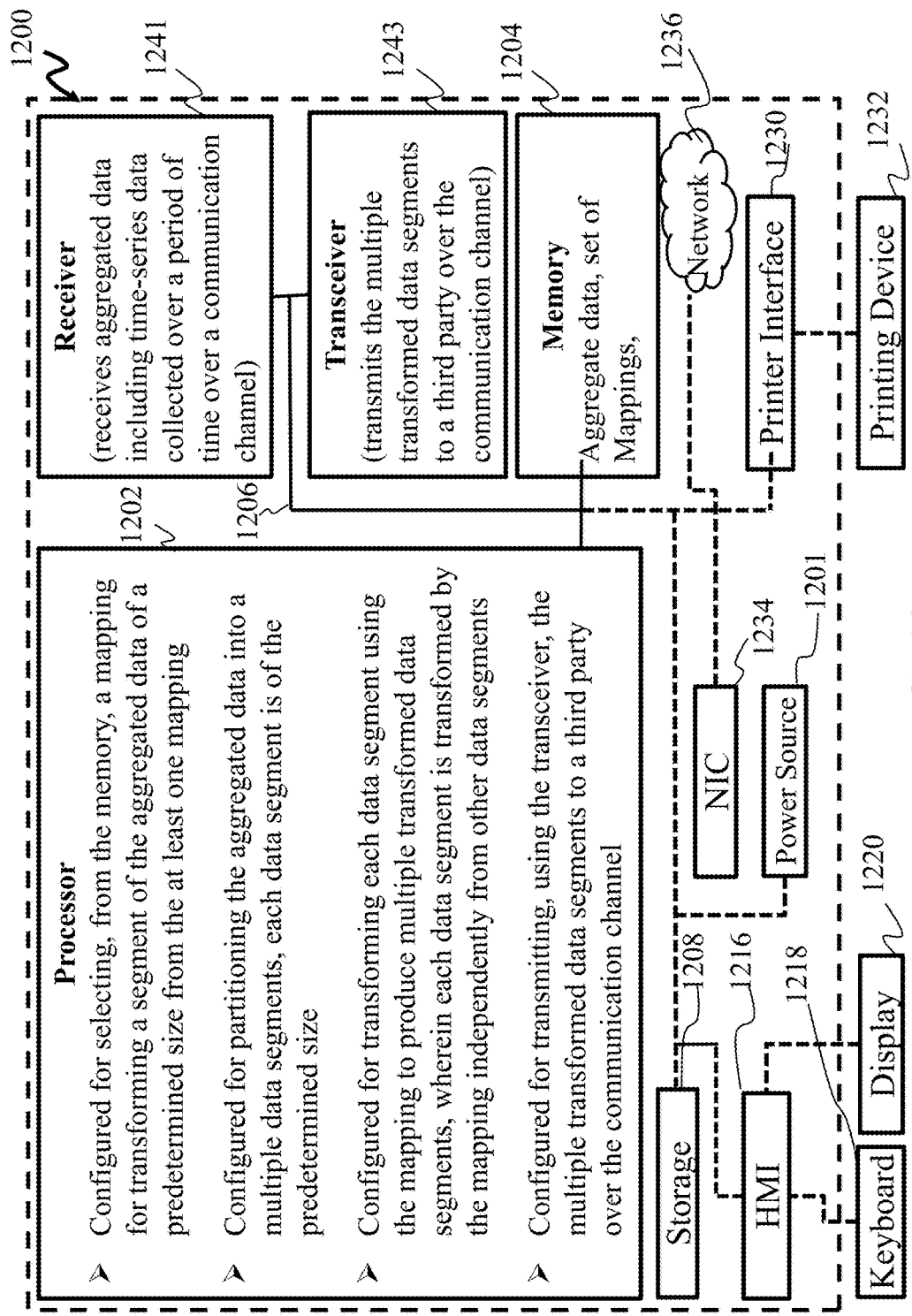
FIG. 12 is a schematic block diagram of a system for transmitting aggregated data to a third party that may be used with one or more embodiments described herein, according to some embodiments of the present disclosure.

FIG. 12 is a schematic block diagram of a system for transmitting aggregated data to a third party that may be used with one or more embodiments described herein, according to some embodiments of the present disclosure. In particular, the system 1200 is configured for modifying the aggregate data so as to protect a privacy of the aggregated data, while preserving analytical usefulness of the aggregated data in accordance with some embodiments of the present disclosure. The system 1200 may include one or more power source 201, depending upon the application, the power source may be optionally located outside of the system. The system 200 includes one or more processor 1202 is connected to at least one memory 1204 via a bus 1206, and is configured to execute stored instructions, among other things. For example, the processor 1202 is configured for selecting, from the memory, a mapping for transforming a segment of the aggregated data of a predetermined size from the at least one mapping. The processor 1202 is configured for partitioning the aggregated data into a multiple data segments, each data segment is of the predetermined size. The processor 1202 is configured for transforming each data segment using the mapping to produce multiple transformed data segments, wherein each data segment is transformed by the mapping independently from other data segments. Further, the processor 1202 is configured for transmitting, using the transceiver, the multiple transformed data segments to a third party over the communication channel.

Contemplated is that the system 1200, and/or at least one component of the system, may be connected to one or more sensors (not shown) or other like measuring devices or monitoring systems. The system includes at least one memory 1204 that stores instructions that are executable by the processor, historical data, and any data to that can be utilized by the system 1200. The processor 1202 can be a single core processor, a multi-core processor, a computing cluster, or any number of other configurations. The processor 1202 can be connected through a bus 1206 to one or more input and output devices. The memory 1204 can include random access memory (RAM), read only memory (ROM), flash memory, or any other suitable memory systems.

Still referring to FIG. 12, the system 1200 can also optionally include a storage device 1208 adapted to store supplementary data and/or software modules used by the processor. For example, the storage device 1208 can store sets of mapping along with sets of parameters used by the processor to select a mapping to transform at least one segment of the aggregated data. Additionally, or alternatively, the storage device 1208 can store historical data similar to the aggregate data. The storage device 1208 can include a hard drive, an optical drive, a thumb-drive, an array of drives, or any combinations thereof.

A human machine interface 1216 can optionally be within the system 1200 and connect the system to an optional keyboard 1218 and an optional display device 1220. The system can be linked through the bus optionally to a display interface (not shown) adapted to connect the system to a display device (not shown), wherein the display device can include a computer monitor, camera, television, projector, or mobile device, among others.

Still referring to FIG. 12, a printer interface 1230 can also optionally be connected to the system 1200 through the bus 1206 and adapted to connect the system 1200 optionally to a printing device 1232, wherein the printing device 1232 can include a liquid inkjet printer, solid ink printer, large-scale commercial printer, thermal printer, UV printer, or dye-sublimation printer, among others. A network interface controller 1234 can optionally be adapted to connect the system 1200 through the bus 1206 to a network 1236. The aggregate data or modified aggregate data, among other things, can be rendered on a display device, imaging device, and/or printing device.

The modified aggregate data, among other things, can optionally be transmitted over a communication channel of the network 1236, and/or stored within the storage system 1208 for storage and/or further processing. Further, the aggregate data may be received wirelessly or wire from a receiver 1241 or transmitted via a transmitter 1243 wirelessly or wire, the receiver and transmitter are both connected to the system 1200 through the bus 1206.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for transmitting aggregated data to a third party, such that a privacy of the aggregated data is protected, while analytical usefulness of the aggregated data is preserved, comprising:
   receiving, using a transceiver, aggregated data including time-series data collected over a period of time;
   selecting, from a memory, a mapping for transforming a segment of the aggregated data of a predetermined size; partitioning the aggregated data into a multiple data segments, each data segment is of the predetermined size;
   transforming each data segment using the mapping to produce multiple transformed data segments, wherein each data segment is transformed by the mapping independently from other data segments, and each mapped data segment of the aggregated data modifies the data segment such that the privacy of the data segment is protected, while analytical usefulness of the data segment is preserved;
   and transmitting, using the transceiver, the multiple transformed data segments to a third party over a communication channel, wherein steps of the method are performed by a processor operatively connected with the memory and the transceiver;
   wherein the mapping further comprises: collecting a training set of the aggregated data; determining a statistical model fitting the training set of the aggregated data; and determining the mapping using the statistical model by optimizing a balance between a criteria for protecting privacy of the transformed aggregated data and a criteria of analytical usefulness of the transformed aggregated data, wherein the criteria of analytical usefulness is above a threshold criteria to allow for third party analytics of the transformed aggregated data by the third party.

2. The method of claim 1, further comprising:
   combining the multiple transformed data segments to form transformed aggregated data; and
   transmitting the transformed aggregated data to the third party.

3. The method of claim 1, further comprising:
   updating the statistical model based on the received aggregated data; and updating the mapping based on the updated statistical model.

4. The method of claim 1, wherein the statistical model is a Factorial Hidden Markov Model (FHMM).

5. The method of claim 1, further comprising:
   selecting the mapping from a set of mappings stored in the memory using a property of the received aggregated data, wherein each mapping from the set of mapping is determined for a different steady state of the aggregated data.

6. The method of claim 5, wherein the property of the received aggregated data is one of:

a time property of the period of time including one or combination of a length of the period of time, a timing of the period of time and a season of the period of time, and a time property related to a behavioral use property considered as privacy data of the period of time.

7. The method of claim 5, further comprising:

retrieving from the memory a set of statistical models, each model corresponds to the mapping from the set of mappings;

fitting the received aggregated data into each statistical model to determining a fitting error for each statistical model; and selecting the mapping from the set of mapping that corresponds to the statistical model with the smallest fitting error.

8. The method of claim 1, wherein the aggregate data includes usage of at least one power consumer by a user, wherein the at least one power consumer includes a structure, a part of a structure, an electronic device, a power consuming device or some combination thereof.

9. The method of claim 1, wherein the multiple data segments of the aggregate data refers to an ongoing and/or future power consumption event by a user having at least one power consumer.

10. The method of claim 1, wherein the aggregate data originates from a user, and is user energy data collected using a metering device located on a consumer side of the metering device.

11. The method of claim 1, wherein the aggregate data originating from a user is energy data collected by the user using a user metering device or a user measuring device located on a user side of a third party metering device, such that the user transmits, using a user transmitter, the transformed aggregated data to the third party over a user communication channel, wherein steps of the method are performed by the processor operatively connected with the user transmitter.

12. A method for transmitting aggregated data to a third party, such that a privacy of the aggregated data is protected, while analytical usefulness of the aggregated data is preserved, comprising:

receiving, using a transceiver, aggregated data including time-series data collected over a period of time;

selecting, from a memory, a mapping for transforming a segment of the aggregated data of a predetermined size, wherein the selecting of the mapping is from a set of mappings stored in the memory using a property of the received aggregated data, wherein each mapping from the set of mapping is determined for a different steady state of the aggregated data;

partitioning the aggregated data into a multiple data segments, each data segment is of the predetermined size;

transforming each data segment using the mapping to produce multiple transformed data segments, wherein each data segment is transformed by the mapping independently from other data segments, and each mapped data segment of the aggregated data modifies the data segment such that the privacy of the data segment is protected, while analytical usefulness of the data segment is preserved;

and combining the multiple transformed data segments to form transformed aggregated data; and transmitting, using the transceiver, the transformed aggregated data to a third party over a communication channel, wherein steps of the method are performed by a processor operatively connected with the memory and the transceiver;

wherein the mapping further comprises: collecting a training set of the aggregated data; determining a statistical model fitting the training set of the aggregated data; and determining the mapping using the statistical model by optimizing a balance between a criteria for protecting privacy of the transformed aggregated data and a criteria of analytical usefulness of the transformed aggregated data, wherein the criteria of analytical usefulness is above a threshold criteria to allow for third party analytics of the transformed aggregated data by the third party.

13. The method of claim 12, wherein the property of the received aggregated data is one of: a time property of the period of time including one or combination of a length of the period of time, a timing of the period of time and a season of the period of time; and a time property related to a behavioral use property considered as privacy data of the period of time.

14. A system for transmitting aggregated data to a third party, such that a privacy of the aggregated data is protected, while analytical usefulness of the aggregated data is preserved, comprising:

a transceiver for receiving aggregated data including time-series data collected over a period of time over a communication channel;

a memory to store at least one mapping for transforming a segment of the aggregated data of a predetermined size;

a processor operatively connected with the memory and the transceiver, the process is configured for:

selecting, from the memory, a mapping for transforming a segment of the aggregated data of a predetermined size from the at least one mapping, partitioning the aggregated data into a multiple data segments, each data segment is of the predetermined size, transforming each data segment using the mapping to produce multiple transformed data segments, wherein each data segment is transformed by the mapping independently from other data segments, and each mapped data segment of the aggregated data modifies the data segment such that the privacy of the data segment is protected, while analytical usefulness of the data segment is preserved;

and transmitting, using the transceiver, the multiple transformed data segments to a third party over a communication channel;

wherein the mapping further comprises: collecting a training set of the aggregated data; determining a statistical model fitting the training set of the aggregated data; and determining the mapping using the statistical model by optimizing a balance between a criteria for protecting privacy of the transformed aggregated data and a criteria of analytical usefulness of the transformed aggregated data, wherein the criteria of analytical usefulness is above a threshold criteria to allow for third party analytics of the transformed aggregated data by the third party.

15. The system of claim 14, wherein the processor is further configured for:

selecting the mapping from a set of mappings stored in the memory using a property of the received aggregated data, wherein each mapping from the set of mapping is determined for a different steady state of the aggregated data, wherein the property of the received aggregated data is one of: a time property of the period of time including one or combination of a length of the period of time, a timing of the period of time and a season of the period of time, and a time property related to a behavioral use property considered as privacy data of the period of time.

16. The system of claim 15, wherein the processor is further configured for:
retrieving from the memory a set of statistical models, each model corresponds to the mapping from the set of mappings;
fitting the received aggregated data into each statistical model to determining a fitting error for each statistical model; and
selecting the mapping from the set of mapping that corresponds to the statistical model with the smallest fitting error.

* * * * *